Aug. 11, 1931.  C. J. SMITH ET AL  1,818,766
SECTIONAL REPAIR BAG
Filed Aug. 27, 1927
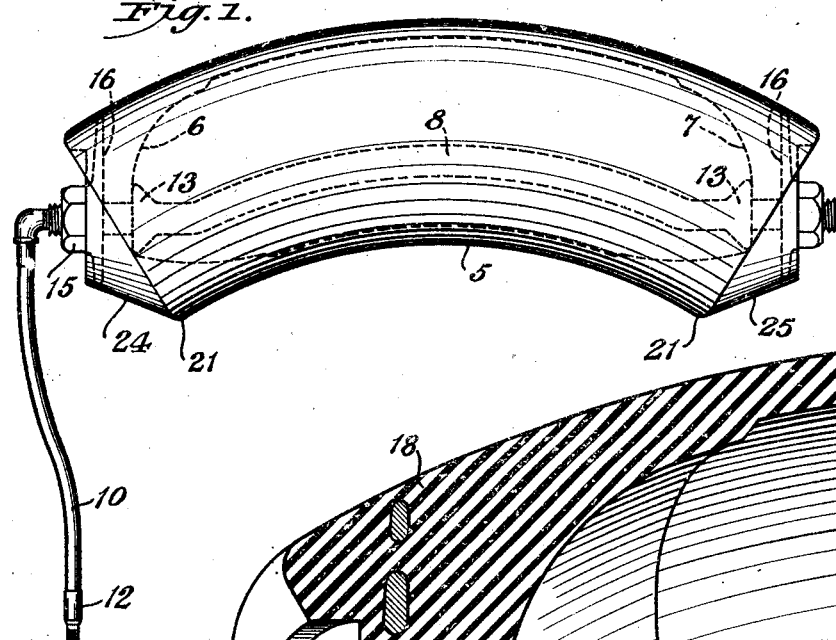
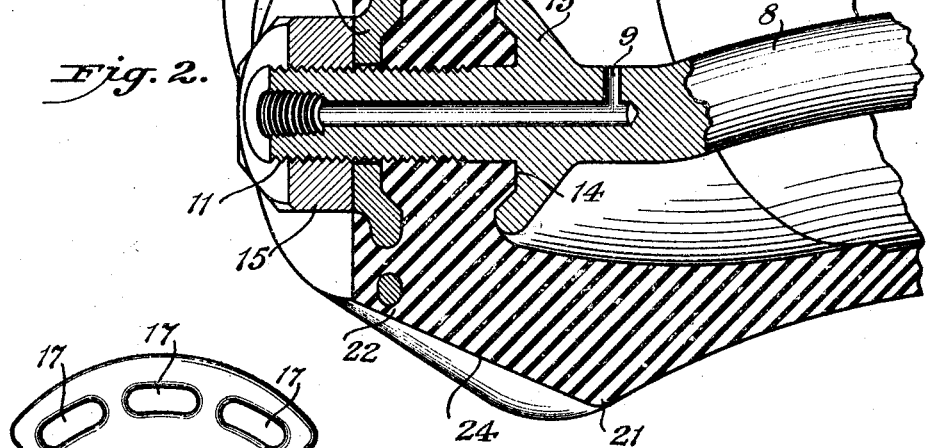
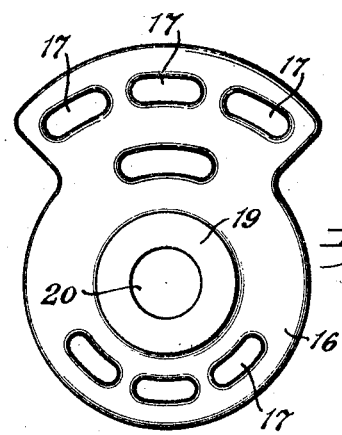
INVENTORS
Clyde J. Smith
George K. McNeill
Chester J. Dolding
BY
ATTORNEY Patented Aug. 11, 1931

1,818,766

UNITED STATES PATENT OFFICE

CLYDE J. SMITH, GEORGE K. McNEILL, AND CHESTER J. DOLDING, OF DETROIT, MICHIGAN, ASSIGNORS TO MORGAN & WRIGHT, OF DETROIT, MICHIGAN, A CORPORATION OF MICHIGAN

SECTIONAL REPAIR BAG

Application filed August 27, 1927. Serial No. 215,812.

This invention relates to air bags for use in the vulcanization of pneumatic tires but more particularly to the sectional type which are provided for the purpose of repairing such tire. The function of these sectional bags is to maintain internal pressure against a repaired portion of a tire casing during the vulcanization process.

Various forms of these sectional repair bags have been devised and these generally comprise a tube of rubberized fabric or rubber and fabric closed at the ends and provided with some means for preventing or limiting endwise expansion. The usual device for preventing such expansion is a rod or tube either rigid or sectional which connects the opposite ends of the tube. After the repair bag is placed within the tire casing it is inflated to provide the necessary pressure.

Some of the disadvantages of the existing types of repair bags are the tendency of the bag to move toward the beads of the casing when the curing is taking place, thus causing injury to the casing at that time; excessive distortion of the ends of the bag which results in serious injury to the same and the early cracking or tearing of the rubber; the absence of sufficient expansibility and flexibility to enable the bag to be used with tires of different sizes and shapes; the inability of the bag to withstand an adequate amount of pressure; and the failure to provide suitable retaining or supporting means for the ends of the bag.

The primary object of the present invention is to provide a sectional repair bag of the all-rubber composition type which is flexible in construction and capable of withstanding an adequate amount of pressure without undue distortion to the bag itself. Further objects are to allow flexibility at the ends of the bag and permit such ends and the portions of the bag adjacent thereto to readily adjust themselves to various sizes of tires, to provide a new and improved end construction whereby excessive distortion at this point is eliminated, to prevent crushing of the toe of the tire due to the wedging action of the ends of the bag, to reduce the cost of production of the bag and increase the life of the same, and in general to provide a new and improved sectional repair bag.

The further objects and advantages of the invention will be better understood by reference to the following specification when considered in connection with the accompanying drawings illustrating a selected embodiment thereof in which—

Fig. 1 is an elevation of a repair bag embodying the principles of our invention;

Fig. 2 is an enlarged detail sectional view of the end portion of the bag shown in Fig. 1; and Fig. 3 is an enlarged detail elevation of the end reinforcing plate.

Referring to the drawings, the repair bag comprises a tubular body portion 5 preferably of an all-rubber composition and molded as a radial segment having a substantially circular transverse section. This body portion is substantially closed at the ends as at 6 and 7. A tie rod 8 connects these ends and acts to prevent longitudinal expansion of the bag. The bag is inflated by admitting air, steam or other fluid through passages as 9 provided for the purpose in the end portions of the rod 8. It is usually customary to provide such passages at both ends of the rod and both of these passages may act as inlets or one as an inlet and the other as an outlet. Suitable valves are provided to regulate the flow of the fluid in these passages. In the present embodiment, a flexible hose as 10 is coupled to the end 11 of the rod 8 and this enables the bag to be attached to a convenient source of pressure supply. This hose is fitted with an ordinary check valve as 12, such as is used in inner tubes.

The tie rod 8 is provided with flanges 13 preferably recessed or cupped as at 14 and the rubber at the ends of the bag is forced against these flanges by nuts 15 on the threaded ends 11 of the rod. The tightening of these nuts 15 forms a tight seal between the body portion of the bag and the rod and this prevents the escape of the fluid in the bag.

A plate as 16 is molded or otherwise embedded in the end portions of the bag and this plate is preferably provided with perforations as 17 so that when the bag is molded, the rubber flows therethrough and securely locks the plate in place. This molding of end plates within the body of the bag is a very important feature as it not only insures the retention of the plate in the proper position but acts to equalize the support at the end of the bag against the internal pressure, and permits the plate to be brought closer inward and consequently further upward, thus giving added protection to the portion 18 of the bag. The plate 16 is of peculiar shape due to the fact that its periphery follows closely the outer edge of the bag, a transverse section of the bag adjacent the plate 16 having an outline similar to the plate 16. It is important that the outline of the plate thus follow closely the edge or outer face of the bag, especially at the portions 18, which must be supported as much as possible to prevent bulging and so that the internal pressure will not distort the ends of the bag sufficiently to be detrimental. The portion of the plate 16 about the opening 20 to receive the tie rod, is preferably recessed or cupped as at 19 in substantially the same manner as the flange 13 at the corresponding end of the tie rod and it is these cup shaped portions which coact to grip the rubber of the bag and form the seal at the ends of the bag when the nuts 15 are tightened.

Air bags having the usual radial ends have proven unsatisfactory because these when applied to a tire tend to crush the toe of the tire at the points of contact of what may be considered the inner corners of the bag. It is believed that this crushing of the tire is due to the wedging action produced by the V-shaped or radial end and by the uneven distribution of area at the ends in relation to the tie rod. In the bag forming the subject matter of the present invention, the ends are preferably parallel to each other and at right angles to the general chord of the arc formed by the bag. These ends proper, however, preferably do not compose the entire end portions of the bag, nor does the plate 16 support such entire portions. An unsupported area, indicated by the line 21—22 (Fig. 2) contains no structural member. The primary objects of this unsupported area are to provide flexibility at the ends and permit the portion in the vicinity of 21 to readily adjust itself to the various sizes and shapes of tires in which the bag may be used. The parallel end construction also increases the area of pressure. The sheath-like construction of the end of the bag makes it possible to shorten the bag while maintaining the same pressure area and improves the action of the bag under pressure. This sheath-like construction is a very important feature. If the reinforcing plates at the ends of the bag do not follow closely the outer face of the bag, the rubber creeps around the edge of the plate and a rupture soon occurs in this zone. The bag also elongates considerably, due to this same movement. Such creeping cannot occur to any extent in the present construction and the life of the bag is very materially increased. The perforations in the end plates 16 permit the rubber on both sides of the plates to bond therethrough and thus prevent extreme distortion by the anchorage effected thereby. The body portion of the bag is preferably thickened where the greatest stress occurs, as will be noted at the portions designated 18 and 21. The inner corners of the bag or those portions designated 24 and 25 are preferably cut away or beveled toward the ends substantially as indicated to prevent crushing of the toe of the tire being repaired. This is an important feature.

From the foregoing description, it will be readily appreciated that any excessive distortion is harmful to the bag because of its continual use in the vulcanization of tire casings, and the bag, being of rubber, will not return to its original shape after being so distorted. The present bag possesses adequate flexibility and very little if any distortion is produced by the internal pressure. The flexibility of the bag enables the same to readily conform to different sizes and shapes of tires and these shapes vary considerably in tires of different makes.

The form of the end retaining plates will naturally be varied for different types of bag but the important element is the elimination of the creeping of the rubber about the edges of the plate as previously described. While the edges of the plates should follow closely the outer face or edge of the bag, it is inadvisable to have the plate actually contact with the tire being repaired as this is liable to cause disfiguration of the tire.

Having thus described our invention, what we claim and desire to protect by Letters Patent is:

1. A sectional repair bag comprising a body portion having end walls and elastic side walls, a tie rod extending longitudinally through the body portion and engaging the ends, and rigid plates embedded in the material of said end walls to form a support therefor.

2. A sectional repair bag comprising a tubular body portion of rubber composition having closed ends, substantially rigid supporting plates embedded in the material of said ends, and a tie rod connecting said plates.

3. A sectional repair bag comprising a tubular body portion of rubber composition having closed ends, substantially rigid supporting plates embedded in the material of said ends, and a tie rod connecting said plates, said plates being perforated and the material of the body extending through the perforations.

4. A sectional repair bag comprising a body portion having end walls and expansible side walls, rigid supporting plates embedded in said end walls, and a tie rod connecting said plates and maintaining the same in parallel relation.

5. A sectional repair bag comprising a body portion having end walls and elastic side walls, portions of the side walls extending beyond said end walls, and a tie rod connecting said end walls, said tie rod having a passage communicating with the interior of said body portion whereby the same may be inflated.

6. A sectional repair bag comprising a substantially tubular body portion arcuate in shape and having side and end walls, the side walls extending beyond the end walls adjacent the outer periphery of said bag, reinforcing plates embedded in the material of said end walls, and a tie rod extending longitudinally through the body portion and connecting said plates.

7. A sectional repair bag comprising a tubular body portion of rubber composition having closed ends, substantially rigid supporting plates having edge portions of different radii of curvature embedded in the material of said ends, and a tie rod connecting said plates, portions of the marginal edges of said plates following closely the corresponding portions of the outer periphery of said bag to prevent creeping of the material of the body past said edges.

8. A sectional repair bag comprising a tubular body portion having side and end walls, a tie rod extending longitudinally within said body portion, a pair of oppositely disposed substantially cup shaped flanges on each end portion of said rod adapted to coact to grip a portion of the corresponding end wall of said body portion and form with the rod a seal for the ends of the bag, one of said flanges in each pair being molded in the material of the corresponding end of the bag and having a portion of its margin following closely the periphery of the bag.

9. A sectional repair bag comprising an arcuate body portion having side walls substantially circular in cross section and parallel end walls, and a tie rod connecting said end walls, the inner corners of said body portion being cut away or beveled.

10. A sectional repair bag comprising a body portion having end walls and elastic side walls, reinforcing plates embedded in the material of the end walls with the marginal edges nearer the outside than the inside arc of said body portion to support the walls, and a tie rod connecting said plates, portions of the walls of said bag adjacent the ends thereof being unsupported by said plates to provide flexibility at the ends and permit the bag to adjust itself to different shapes and sizes of tires.

11. A sectional repair bag comprising an arcuate body portion closed at the ends, and having reinforcing plates in each of its ends in parallel relation, the marginal portions of said plates being nearer the outside than the inside arc of said body portion.

12. A sectional repair bag comprising an arcuate body portion closed at the ends, reinforcing plates in said ends in parallel relation, the marginal portions of said plates being nearer to the outside than the inside arc of said body and the body having a flexible thick walled rubber portion between the inner marginal portion of each of said plates and the corresponding ends of the inner arcuate surface of the bag.

13. A sectional repair bag comprising an arcuate body portion closed at the ends, and a reinforcing plate in each of its ends in parallel relation, the end portions of said body adjacent the inner arc being bevelled or turned inwardly away from said arc to provide a space between the inner marginal edges of the end walls of said arc.

14. A sectional repair bag comprising an arcuate body portion closed at the ends and a reinforcing plate in each of its ends in parallel relation, the end portions of said body adjacent the inner arc being bevelled or turned inwardly away from said arc to provide a space between the inner marginal edges of the end walls and said arc, and the bevelled wall being thickened.

15. A sectional repair bag comprising an arcuate body portion closed at the ends and a reinforcing plate embedded in the material of each of said ends, a tie rod extending through said body and said plates and maintaining said plates in parallel relation, flanges on said rod opposite each of said plates, the rubber end wall of the bag being gripped between one of said flanges and the opposing plate, and nuts on the threaded end portions of said rod acting to force said plates toward the corresponding flanges, the portion of each of said plates opposite the nut being exposed to provide metal to metal contact.

16. A metallic supporting device for an end wall of a sectional repair bag having provision for securing a tie rod thereto, the edges of the support having portions of different radii of curvature relative to the place of attachment of the tie rod, and openings formed in the support for the passage of bonding portions of the material of the repair bag.

17. A sectional repair bag comprising an arcuate body portion closed at the ends and having reinforcing plates with edge portions of different radii of curvature in each of the bag ends in parallel relation, the marginal portions of said plates being nearer the outside than the inside arc of said body portion.

Signed at Detroit, county of Wayne, State of Michigan, this 19th day of August, 1927.

CLYDE J. SMITH.

Signed at Detroit, county of Wayne, State of Michigan, this 19th day of August, 1927.

GEORGE K. McNEILL.

Signed at Detroit, county of Wayne, State of Michigan, this 19th day of August, 1927.

CHESTER J. DOLDING.